Figure 3:
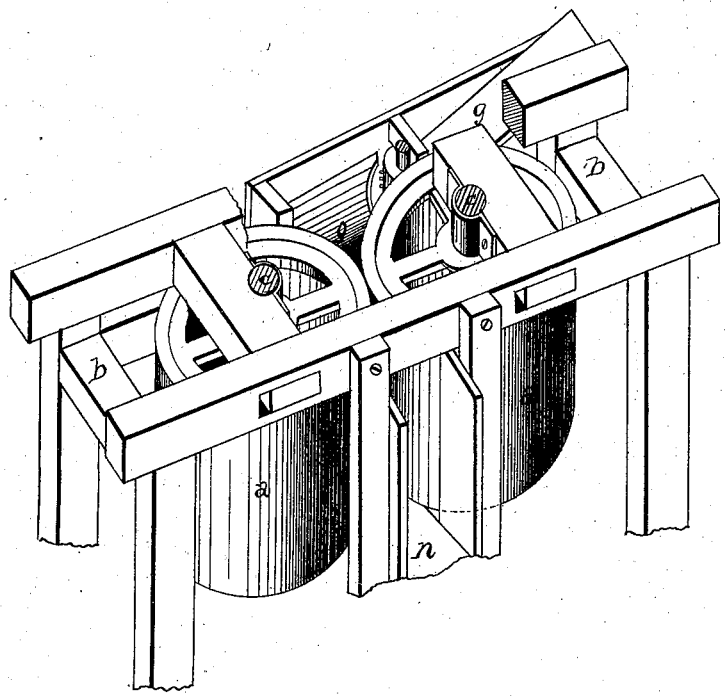

D. PHILLIPS.
CIDER-PRESSES.
No. 194,560. Patented Aug. 28, 1877.
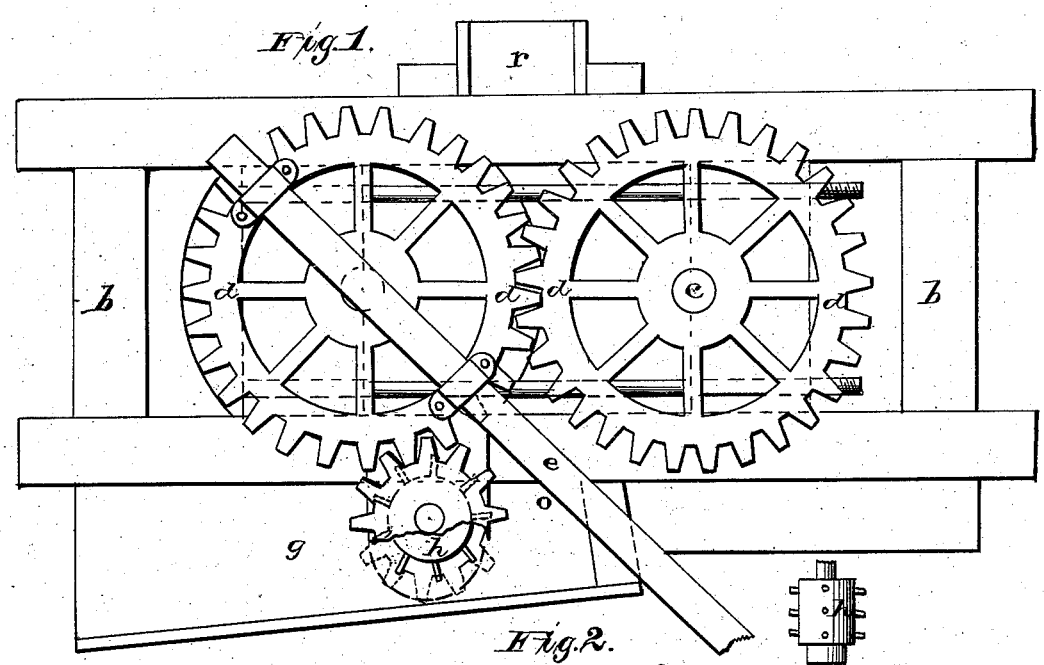
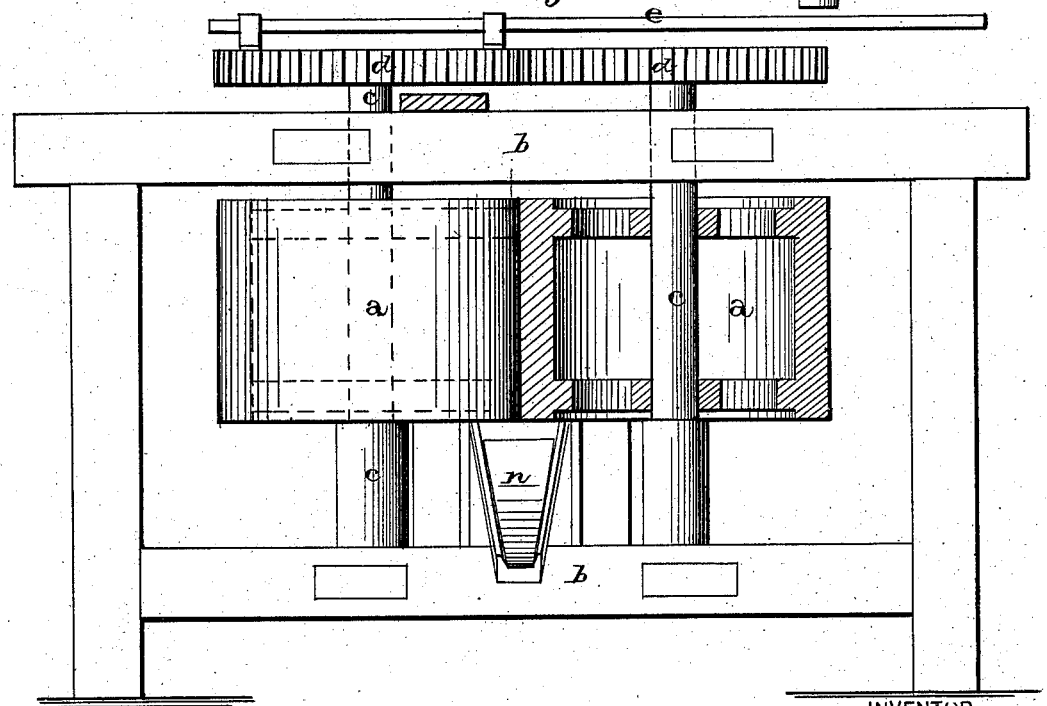

2 Sheets—Sheet 2.

D. PHILLIPS.
CIDER-PRESSES.

No. 194,560. Patented Aug. 28, 1877.

WITNESSES

INVENTOR
Daniel Phillips
per
F. A. Lehmann
atty.

UNITED STATES PATENT OFFICE.

DANIEL PHILLIPS, OF COLLAMER, INDIANA, ASSIGNOR OF TWO-THIRDS OF HIS RIGHT TO D. AND I. HAINES, OF SAME PLACE.

IMPROVEMENT IN CIDER-PRESSES.

Specification forming part of Letters Patent No. 194,560, dated August 28, 1877; application filed June 18, 1877.

*To all whom it may concern:*

Be it known that I, DANIEL PHILLIPS, of Collamer, in the county of Whitley and State of Indiana, have invented certain new and useful Improvements in Cider-Press; and I do hereby declare the following to be a full, clear, and exact description of the invention, such as will enable others skilled in the art to which it pertains to make and use it, reference being had to the accompanying drawings, which form part of this specification.

My invention relates to an improvement in cider-mills; and it consists in the arrangement and combination of parts, that will be more fully described hereinafter, whereby the apples are fed into the mill, crushed to pomace, the cider extracted and run off into a receptacle that is prepared to receive it, while the pomace is passed out of the machine on the other side.

Figure 1 is a plan view. Fig. 2 is a side elevation, partly in section; and Fig. 3 is a perspective of my invention, certain parts being removed.

*a* represents two large hollow rollers, of any desired construction, which are made to revolve horizontally around in opposite directions, with their sides just touching each other.

The shafts or journals *c* of these rollers are provided with suitable bearings in the frame *b*, and have secured to their upper ends the two large gear-wheels *d*, which mesh together, and one of them has attached to its top the sweep *e*, to which the horse is fastened for the purpose of operating the mill.

Upon one side of the frame *b* is made the hopper *g*, which has an inclined bottom, in the center of which is placed a grinding-roller, *h*, for crushing the apples as they are fed into the hopper. This roller has a small pinion upon the upper end of its shaft, which meshes with, and is operated by, one of the gear-wheels *d*.

As the apples are crushed the crushed portions fall down the inclined surface *o*, and are conducted between the two rollers. As the rollers revolve the apples are drawn in between them so as to express the juice, which runs down into the cider-trough *n* on one side, while the pomace is carried on through by the rollers and thrown out through the trough *r* on the opposite side.

It will be seen that the whole operating parts of this machine consist of three gear-wheels, a grinding-roller, and two squeezing-rollers, and that the work of making cider can be carried on more rapidly and economically than in other mills now in the market.

Having thus described my invention, I claim—

In a cider-press, the combination of the two rolls *a*, placed vertically in the frame *b*, shafts *c*, gear-wheels *d*, pinion, crushing-roller *h*, hopper *g*, sweep *e*, and the two troughs *n r*, the parts being combined and arranged to operate substantially as shown and described.

In testimony that I claim the foregoing I have hereunto set my hand this 8th day of June, 1877.

DANIEL PHILLIPS.

Witnesses:
WRIGHT LANCASTER,
S. J. FASLER.